FIG. A.
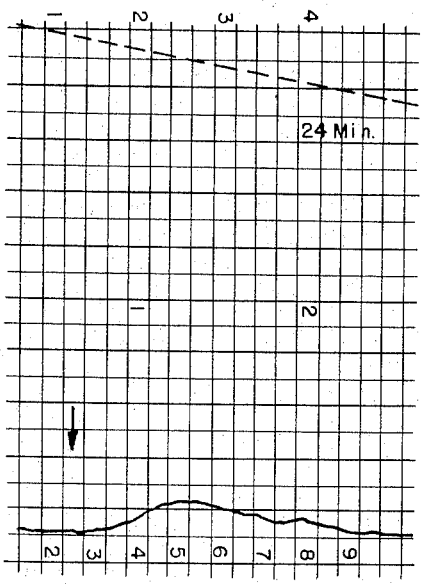
FIG. B.
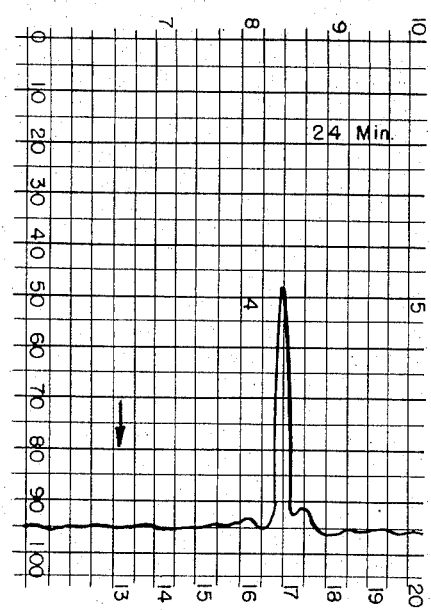

United States Patent Office 3,728,145
Patented Apr. 17, 1973

3,728,145
METHOD FOR TREATING A TRANSPARENT TUBE FOR USE IN AN OPTICAL ANALYZING APPARATUS
Vilhelm Einar Stellan Hjerten, Uppsala, Sweden, assignor to Incentive Research & Development AB, Stockholm, Sweden
Continuation-in-part of abandoned application Ser. No. 721,481, Apr. 15, 1968. This application Apr. 15, 1971, Ser. No. 134,152
Claims priority, application Sweden, Apr. 20, 1967, 5,527/67
Int. Cl. C03c 17/32, 19/00
U.S. Cl. 117—54
26 Claims

ABSTRACT OF THE DISCLOSURE

A method for treating transparent tubes to eliminate the electroendosmotic effect comprising coating of the inner wall of the tube with a neutral hydrophilic substance, e.g. methyl cellulose, which eliminates electroendosmosis by increasing the viscosity or the resistance to flow adjacent to the tube wall for a liquid in the tube. Also the optical properties of the tubes can be improved by grinding of the outer and inner walls of the tube before the coating step to give the tube a constant wall thickness and a constant cross-section area.

RELATED CASE

Figure 1:
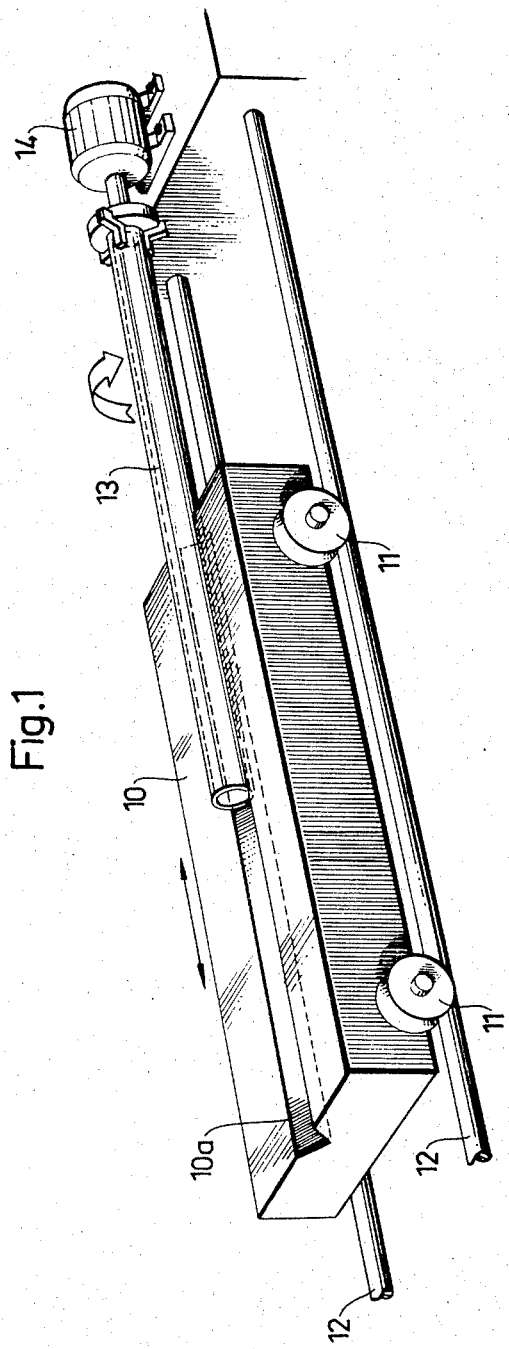

This application is a continuation-in-part of my copending application Ser. No. 721,481 filed Apr. 15, 1968, and now abandoned.

DESCRIPTION OF THE INVENTION

The present invention relates to a method for treating tubes of transparent materials, which tubes are intended for use in optical analyzing apparatuses, e.g. in electrophoresis apparatuses. An apparatus of this type is described in my copending application No. 601,963 filed Dec. 15, 1966, and now Pat. No. 3,505,524. The invention also relates to a tube for use in such apparatuses. Suitable transparent materials include glass, quartz, or transparent plastics such as polyesters, acrylate polymers, methacrylate polymers, polystyrene, and the like.

Transparent tubes for use in optical analyzing apparatuses, and especially in electrophoresis apparatuses, must have good optical properties and be manufactured with very close tolerances. The tubes must e.g. be absolutely straight and have constant wall thickness and cross-section area throughout its length, which can amount to 16 inches or more today, commercially available tubes do not comply with the high requirements for this field of application. According to one aspect of this invention, the optical quality of the tubes can be improved by grinding.

Furthermore, in all types of electrophoresis a disturbing effect appears. This effect is called electroendosmosis and can be described in the following way. If, in an electrophoresis tube filled with a buffer solution, a zone of uncharged substance is entered, this zone will be displaced in the tube in spite of its uncharged condition when an electric voltage is applied between the ends of the tube. This displacement is due to an electric charge, which is usually negative, on the inner wall of the tube.

It is well known (cf. Abramson, Moyer, Gorin: Electrophoresis of Proteins, Reinhold Publishing Company, New York, 1942) that the speed $v$ of the displacement of said zone can be calculated from the following expression $$V = \frac{E \cdot D \cdot \psi_0}{4\pi\eta} \quad (1)$$

where $E$ is the electric field strength
$D$ is the dielectric constant
$\psi_0$ is the potential at the so called slipping plane
$\eta$ is the viscosity coefficient which is assumed to be constant throughout the solution.

The electrophoresis apparatus of the type described in said copending application is very sensitive to electroosmosis. Therefore, in the transparent tubes for use in such an apparatus the electroosmotic effect must be eliminated which previously has not been possible. Thus, on p. 441 in M. Bier, Electrophoresis, Theory, Methods and Applications, Academic Press Inc., New York, 1959 (probably the most exhaustive work on electrophoresis) it is stated that: "Electroosmotic streaming of the liquid past the cell walls cannot be eliminated or counteracted by any known method." However, by coating the inner wall of the electrophoresis tube with a neutral hydrophilic substance as described in this patent application the electroosmosis can be eliminated. This is illustrated in the figures enclosed. FIG. A shows an electrophoresis in an untreated tube and FIG. B the same experiment in a tube treated as described in this patent application. FIG. A shows a very broad and ill-defined peak while in FIG. B a very sharp and well-defined peak has been obtained. Even small peaks in front of and behind the main peak in FIG. B are easily detectable (these small peaks cannot be detected in FIG. A). A comparison of FIG. A and FIG. B shows how important it is to eliminate electroosmosis (or electroendosmosis as this phenomenon is also called). The figures are reproduced from p. 63 in the inventor's thesis "Free Zone Electrophoresis," Almqvist and Wilsells Boktryckeri AB, Uppsala, Sweden, 1967.

Accordingly, an object of the invention is to provide a transparent tube suitable for use in an optical analyzing apparatus, e.g. an electrophoresis apparatus.

Another object of the invention is to provide long and very straight tubes having constant wall thickness and cross-section area.

Another object of the invention is to eliminate the electroendosmotic effect in transparent electrophoresis tubes.

The invention will appear more clearly from the following detailed description when taken in connection with the accompanying drawings.

Figure 2:
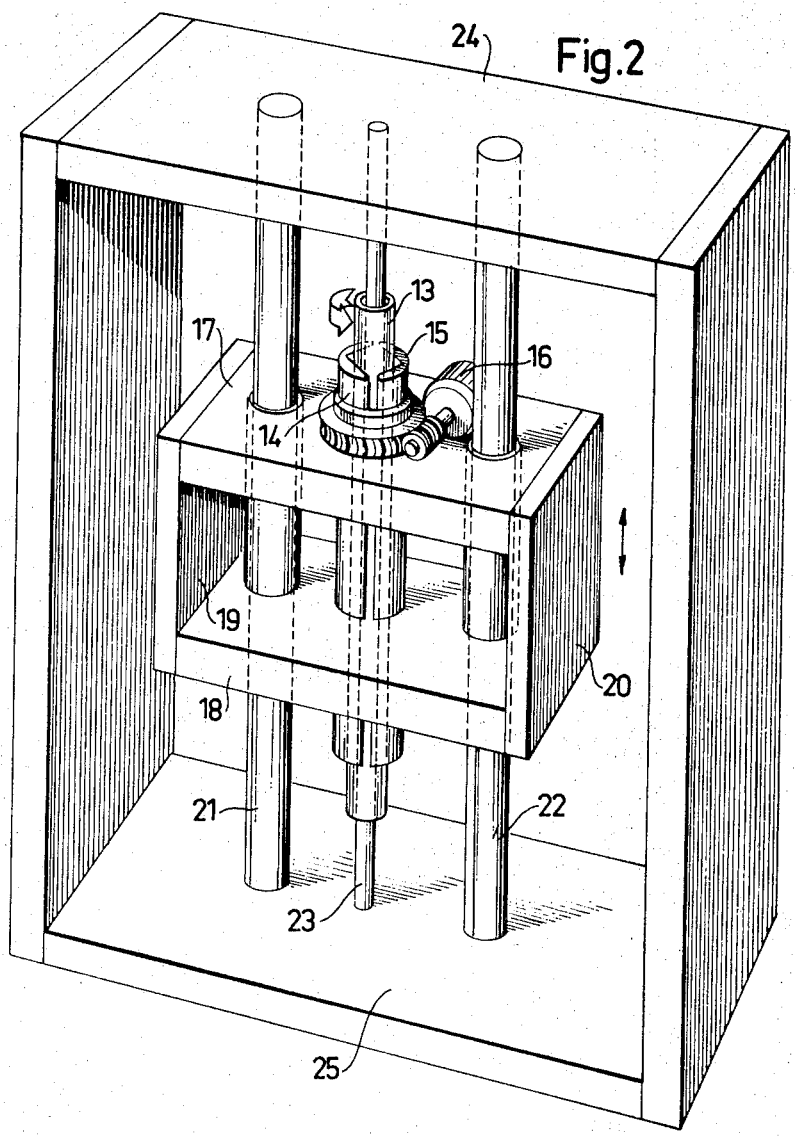
Figure 3:
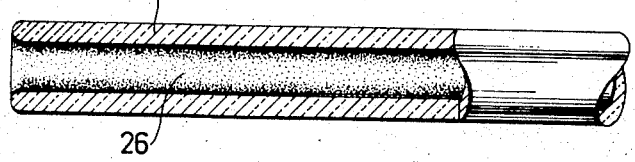

FIG. 1 is a perspective view illustrating a method of grinding the outer wall of the tube.
FIG. 2 is a perspective view illustrating a method of grinding the inner wall of the tube.
FIG. 3 shows a section of the finished tube.

With reference to FIG. 1, a block or carriage 10 with four wheels 11 is movable back and forth on two steel rods 12 by means of a (not shown) driving motor. The top surface of the block 10 is provided with a V-shaped channel 10a in which an electrophoresis tube 13 is to be placed for the grinding operation. The tube 13, preferably of quartz, can be rotated about the longitudinal axis by a motor 14, as indicated by the arrow. There must be a "loose" coupling for instance by means of a piano-wire between the motor 14 and tube 13 in order to obtain the same pressure along the whole length of the tube 13 against the walls of the V-shaped channel 10a.

A rough grinding operation can be performed in the following way. The tube 13 is filled with mercury to increase the pressure against the walls in the V-shaped channel 10a, containing a suspension of a grinding powder, e.g. consisting of carborundum. The tube is then rotated and at the same time block 10 is moved back and forth on the rods resulting in a very uniform grinding of the outer wall of the tube.

For rough grinding of the inner wall, as shown in FIG. 2, the tube 13 is clamped between two metal bars 14, 15 which are provided with V-shaped channels surrounding the tube. The bars 14, 15 are mounted in metal plates 17, 18 and can be made to rotate by means of a motor 16. The motor is attached to the metal plate 17 and said plate is in turn rigidly connected to the metal plate 18 by means of two side plates 19 and 20. The entire unit comprising the metal plates 17, 18, the side plates 19, 20 and the clamping bars 14, 15 can be moved up and down along two guides 21 and 22, clamped between two metal plates 24 and 25, by means of a motor (not shown). A copper wire 23 is also clamped between the metal plates 24 and 25 and passes through the tube 13. The top plate 24 is removable to make it possible to put in and take out the tube 13 and to replace the copper wire 23.

Grinding is accomplished in the following way. Grinding powder, e.g. consisting of carborundum in suspension, is entered into the tube and the tube is then rotated about the copper wire 23 and, at the same time, the unit comprising the metal plates 17, 18 and the side plates 19, 20 is moved up and down. The copper wire 23 must after certain time intervals be replaced by wires having successively greater diameters. In this way, a very uniform grinding of the inner wall is provided throughout the length of the tube. The apparatus in FIG. 2 can, of course, be turned 90° so that the tube to be ground has a horizontal position.

After the rough grinding of the tube, as described above, the outer and inner walls of the tube must also be fine ground or polished. For this grinding and/or polishing it is suitable to use a suspension of iron oxide in water as grinding or polishing agent.

The polishing of the outer wall can be made in the following way. A suspension of iron oxide in water is poured on a support, e.g., of wood, coated with pitch. The support is then pressed against the tube and moved back and forth along the rotating tube which preferably is clamped in a chuck machine.

The polishing of the inner wall of the tube can, e.g., be made in the following way. A polyvinylchloride rod, the diameter of which is less than the inner diameter of the tube and which is provided with a coating of pitch, is clamped in a chuck machine. The tube is filled with a suspension of iron oxide and is then moved over the rotating rod.

The elimination of the above-mentioned electroendosmotic effect is now to be described. It is shown by the inventor in his thesis "Free Zone Electrophoresis" (Almqvist & Wiksells Boktryckeri AB, Uppsala, Sweden, 1967) that the above-given expression (1) for the speed of the displacement of the uncharged zone generally can be written in the following way.

$$\frac{E \cdot D}{4\pi} \int_0^r \frac{\psi^0 1}{\eta(x)} \cdot d\psi(x) \qquad (2)$$

where $\eta$ is not a constant but varies with the distance $x$ from the tube wall. $\psi(x)$ is the potential at the distance $x$ from the tube wall. This expression shows that it is not necessary to increase $\eta$ throughout the solution to reduce the speed $v$ but that it is enough to increase $\eta$ in the area in which $\psi(x) \neq 0$, i.e. in a very thin layer adjacent to the tube wall.

One way to reduce the speed $v$ is thus to increase the viscosity in a very thin layer adjacent to the tube wall. The same effect as with such a viscosity increase can be achieved by increasing the resistance to flow adjacent to the tube wall. This can be made by coating the inner wall of the tube with a hydrophilic coating, preferably a neutral polymer, which either gives a high viscous solution usually above 10 centipoises or a gel which can stick to the quartz tube wall. The polymer should not be so water-soluble that it is rapidly dissolved by the buffer solution in the tube. Furthermore, it should not comprise ionizable groups. The coating to eliminate electroosmosis according to the present invention need only be from 10 to 100 angstroms thick. However as a practical matter such thin films are quite difficult to obtain and therefore, the coatings actually used are thicker.

From Equation 2 it is evident that the electroendosmosis $v$ will be small if the viscosity $\eta$ is high or if the potential $\psi$ (which is a function of the charge on the tube wall) is low. If $\psi=0$ then $v=0$ for all values of the viscosity $\eta$. However in practise it is impossible to obtain tubes which have $\psi=0$ (i.e., no surface charge. But Equation 2 indicates that the lower the potential $\psi$ is the lower the viscosity $\eta$ required to give an electroendosmotic velocity $v$ virtually equal to 0. Therefore one should in the examples below in general not state that the coating must have that or that viscosity to be efficient for elimination of the electroendosmosis as $v$ is a function not only of the viscosity $\eta$ but also of the potential $\psi$ which varies from experiment to experiment dependent on the nature of the liquid in the electrophoresis tube. It should be noticed that the above statement that the electroendosmotic speed $v$ can be virtually eliminated by increasing the viscosity in a very thin layer adjacent to the tube wall is not evident from Equation 1 where $\eta$ refers to the bulk value of viscosity but only from Equation 2 deduced by the inventor in his thesis Free Zone Electrophoresis (Almqvist & Wiksells Boktryckeri AB, Uppsala, 1967).

In a first way, the wall is coated with a water-soluble polymer, such as a cellulose derivate, and after this the polymer molecules are cross-linked.

In a second way the wall is coated with a polymer which is not water-soluble but which expands in water.

EXAMPLE 1

Methylcellulose having a substitution degree of about 1.8 and a molecular weight of 200,000 is very water-soluble and can be cross-linked with formaldehyde in the following way: Methyl cellulose (0.4 g.) is dissolved in 100 ml. distilled water. Formic acid, 7 ml. (catalyst) and then formaldehyde, 35 ml. are added with stirring. The tube is filled with this solution. After five minutes the tube is drained and then placed in an oven at 120° C. for 40 minutes to achieve the cross-linking. The methyl cellulose in this example can be replaced by hydroxyethyl cellulose.

EXAMPLE 2

Another usable water-soluble polymer is polyacrylamide which without cross-linking is coated on the tube wall as a high viscous solution. The concentration of the polyacrylamide solution is about 4%. The solution is made by dissolving 4 grams acrylamide, 0.2 gram of ammonium persulfate (initiator), and 0.2 gram of β-dimethylaminopropionitrile or N,N,N',N'-tetramethylethylenediamine (accelerator) in 100 ml. of water, and effecting polymerization of the acrylamide at room temperature for about 60 minutes. The tube is filled with this solution. After 5 minutes the tube is drained and then placed in an oven at 120° C. for 40 minutes in order to increase the adherence of the polyacrylamide to the tube wall.

A coating of polyacrylamide can also be obtained by direct polymerization on the tube wall from a high-viscous monomer solution, comprising e.g. 4.86 grams acrylamide, 0.14 gram of N,N'-methylene-bisacrylamide, 0.2 gram of β-dimethylaminopropionitrile or N,N,N',N'-tetramethylethylenediamine and 0.2 gram of ammonium persulphate and 0.4 gram of the methyl cellulose of Example 1 in 100 ml. of distilled water. The solution can also be made high-viscous by adding the non-cross-linked polyacrylamide of Example 2 in place of the methyl cellulose.

The polymerization is effected by heating the solution at 25–90° C. for about 50 minutes.

According to another way of polymer is used which is not water-soluble but which expands in water. Such a polymer is dissolved in an organic solvent. The tube is filled with this polymer solution. After draining the organic solvent is removed, e.g., in an oven. The following examples of suitable polymers can be mentioned:

(a) Methyl cellulose with a methoxyl content of about 30% and a hydroxypropoxyl content of about 10% and with an 80% ethyl alcohol as solvent. The concentration of the methyl cellulose, for instance, can be 0.4 gram per 100 ml. of the 80% ethyl alcohol.

(b) Polyvinylacetate in which about half of the number of acetate groups have been replaced by OH-groups making this polymer more hydrophilic. Such a polymer is thus of the type polyvinylalcohol. As solvent a 50%-ethylalcohol is used. The concentration of the polyvinylacetate, for example, can be 0.5 gram per 100 ml. of the 50% ethyl alcohol.

FIG. 3 shows a cross-section of the finished tube, i.e. after the grinding and coating steps. The tube 13 has now a very constant wall thickness and a coating 26 on the inner wall.

Finally, it must be stressed that the method according to the invention when concerned with both of the problems discussed above, comprises two steps, the first of which is a grinding of the inner and outer walls of the tube to improve optical properties and the second being a coating of the inner wall of the tube to eliminate electroosmosis.

What is claimed is:

1. The method of treating a transparent tube to eliminate the electroosmotic effect, wherein said transparent tube is straight, has constant wall thickness along its entire length, and has very smooth inner and outer wall surfaces, which comprises coating the inner wall of said tube with a neutral hydrophilic polymer which does not contain ionizable groups and which gives either a highly viscous solution or a gel which can stick to the tube wall; said polymer not being so water-soluble that it is rapidly dissolvable by a buffer solution in said tube, and wherein the thickness of the polymer on the inner wall of said tube is sufficient to eliminate the electroosmotic effect.

2. The method of claim 1 wherein the inner wall of the tube is coated with a cross-linked polyacrylamide gel or a polyacrylamide in the form of a high-viscous solution without cross-linking.

3. The method of claim 1 wherein the inner wall is coated with a solution in water of a water-soluble polymer, and adding to the solution in water a substance for cross-linking the polymer molecules and a catalyst prior to coating.

4. The method of claim 3 wherein the inner wall of the tube is coated with a solution of a cellulose derivate, formaldehyde, and formic acid in water, and then heating the tube to provide cross-linking.

5. The method of claim 4 wherein the inner wall of the tube is coated with a solution of methyl cellulose, formaldehyde, and formic acid in water.

6. The method of claim 4 wherein the inner wall of the tube is coated with a solution of hydroxyethyl cellulose, formaldehyde and formic acid in water.

7. The method of claim 1 wherein the inner wall of the tube is coated with a solution of acrylamide, N,N'-methylenebisacrylamide, β-dimethylaminopropionitrile or N,N,N',N'-tetramethylethylenediamine, and ammonium persulphate in water, and adding methyl cellulose or non-cross-linked polyacrylamide to make the solution highly viscous for increasing the adherence to the tube wall.

8. The method of claim 1 wherein the coating of the inner wall of the tube is done by introducing a solution in an organic solvent of a polymer not soluble but expanding in water in the tube, draining the unadhered solution after a few minutes and removing the organic solvent.

9. The method of claim 8 wherein the inner wall of the tube is coated with methyl cellulose having a methoxyl content of about 30% and a hydroxypropoxyl content of about 10% together with an 80%-ethyl alcohol.

10. The method of claim 8 wherein the inner wall of the tube is coated with polyvinylacetate in which about half of the number of acetate groups have been substituted by OH-groups together with a 50%-ethylalcohol.

11. The method of claim 1 wherein said transparent tube is selected from the group consisting of glass and quartz.

12. The method of claim 8 wherein said transparent tube is selected from the group consisting of glass and quartz.

13. The method of claim 1 which further includes:
(a) rough grinding the outer and inner walls of the tube to achieve a constant wall thickness and cross-section area by using a grinding powder brought into contact with the outer and inner walls of the tube and providing a rotational and back and forth relative movement between the tube and the grinding powder; and
(b) fine grinding of the outer and inner wall of the tube; said rough and fine grinding being carried out prior to coating the inner wall of the tube.

14. The method of claim 13 wherein the rough grinding of the inner wall of the tube is accomplished by filing the tube with grinding powder, rotating the tube about a concentrically arranged metal wire in the tube, moving the tube back and forth along the wire, and replacing the wire by wires having successively greater diameters during the grinding operation.

15. The method of claim 13 wherein the fine grinding of the outer and inner walls of the tube is done by using a suspension of grinding powder, pressing the grinding material against the inner and outer walls of the tube, and rotating the tube about its longitudinal axis.

16. The method of claim 13 wherein the fine grinding of the outer and inner walls of the tube is done by pressing the grinding material against the outer and inner walls by using a support of rigid material having one surface coated with pitch, the grinding powder being applied to the pitch coated surface.

17. A tube of transparent material having constant wall thickness and cross-section area, comprising a coating on the inner wall of the tube of a neutral hydrophilic polymer which does not contain ionizable groups and which increases the flow resistance adjacent to the tube wall, and wherein said coating is of sufficient thickness on said inner wall so as to eliminate electroosmosis.

18. The tube of claim 17 wherein said transparent material is selected from the group consisting of glass and quartz.

19. The tube of claim 17 wherein said polymer is a cross-linked cellulose derivative.

20. The tube of claim 19 wherein said cellulose derivative is methyl cellulose.

21. The tube of claim 19 wherein said cellulose derivative is hydroxy ethyl cellulose.

22. The tube of claim 17 wherein said polymer is methyl cellulose having a methoxyl content of about 30% and a hydroxypropoxyl content of about 10%.

23. The tube of claim 17 wherein said polymer is polyacrylamide.

24. The tube of claim 17 wherein said polymer is a polyvinyl acetate in which about half of the number of acetate groups have been substituted by OH-groups.

25. The method of claim 1 wherein the thickness of the coating is from 10 to 100 angstroms.

26. The tube of claim 17 wherein the thickness of the coating is from 10 to 100 angstroms.

References Cited
UNITED STATES PATENTS

| | | | |
|---|---|---|---|
| 3,499,833 | 3/1970 | Ferris et al. | 204—299 |
| 914,244 | 3/1909 | Conradson | 51—283 |
| 1,697,609 | 1/1929 | Pivin | 51—283 |
| 2,736,992 | 3/1956 | Magash et al. | 51—283 |
| 3,387,710 | 6/1968 | Pogacar | 117—97 |
| 2,630,659 | 3/1952 | Monnet | 51—283 |
| 2,787,559 | 4/1957 | Coney et al. | 117—124 E |
| 3,137,585 | 6/1964 | Salo et al. | 117—124 D |
| 3,346,479 | 10/1967 | Watelson | 204—299 |
| 3,488,215 | 1/1970 | Shepherd | 117—161 UE |

OTHER REFERENCES

Hjerten, Stellan: "Free Zone Electrophoresis," Uppsala (1967), pp. 38, 51 and 61–62.

WILLIAM D. MARTIN, Primary Examiner

W. H. SCHMIDT, Assistant Examiner

U.S. Cl. X.R.

51—290; 117—97, 124 D, 95, 124 E, 161 C, 161 L, 161 UC, 166; 204—180 R